United States Patent
Ritchey et al.

(10) Patent No.: US 10,957,075 B2
(45) Date of Patent: Mar. 23, 2021

(54) REPRESENTATION OF A COMPONENT USING CROSS-SECTIONAL IMAGES

(71) Applicant: Rolls-Royce Corporation, Indianapolis, IN (US)

(72) Inventors: Andrew James Ritchey, Lafayette, IN (US); Tyler Mason, Pickerington, OH (US)

(73) Assignee: Rolls-Royce Corporation, Indianapolis, IN (US)

(*) Notice: Subject to any disclaimer, the term of this patent is extended or adjusted under 35 U.S.C. 154(b) by 111 days.

(21) Appl. No.: 16/191,322

(22) Filed: Nov. 14, 2018

(65) Prior Publication Data

US 2019/0188881 A1  Jun. 20, 2019

Related U.S. Application Data

(60) Provisional application No. 62/599,305, filed on Dec. 15, 2017.

(51) Int. Cl.
  *G06T 7/90* (2017.01)
  *G06T 7/60* (2017.01)
  (Continued)

(52) U.S. Cl.
  CPC ............. *G06T 7/90* (2017.01); *G06T 7/0006* (2013.01); *G06T 7/60* (2013.01); *G06T 7/70* (2017.01);
  (Continued)

(58) Field of Classification Search
  CPC ........... G06T 7/90; G06T 7/0006; G06T 7/60; G06T 7/70; G06T 15/00;
  (Continued)

(56) References Cited

U.S. PATENT DOCUMENTS 2,410,888 A   11/1946 Lucy
5,429,488 A    7/1995 Neu
(Continued)

FOREIGN PATENT DOCUMENTS

| CN | 202454772 U | 9/2012 |
| CN | 103737814 A | 4/2014 |
| CN | 106202728 A | 12/2016 |

OTHER PUBLICATIONS

Machine translation for CN 106202728, IDS (Year: 2016).*
(Continued)

*Primary Examiner* — Qian Yang
(74) *Attorney, Agent, or Firm* — Shumaker & Sieffert, P.A.

(57) ABSTRACT

A method includes receiving a cross-sectional image of a component, including a plurality of pixels representing the component, at a perspective, determining a threshold color value based on color values associated with the plurality of pixels, and setting an updated color value for each pixel of the plurality of pixels based on the threshold color value. The method includes analyzing a set of adjacent pixels of the cross-sectional image that is selected based on a geometric parameter based on an expected geometry of a physical domain of the component, identifying a plurality of adjacent pixels from the set of adjacent pixels that is likely to be associated with the physical domain of the component based on the updated color values associated with the plurality of adjacent pixels, and outputting a representation of the component including the plurality of adjacent pixels that are likely to be associated with the physical domain.

20 Claims, 5 Drawing Sheets

(51) Int. Cl.
  *G06T 7/70* (2017.01)
  *G06T 7/00* (2017.01)
  *G06T 15/00* (2011.01)
(52) U.S. Cl.
  CPC .... *G06T 15/00* (2013.01); *G06T 2207/10016* (2013.01); *G06T 2207/10081* (2013.01); *G06T 2207/30124* (2013.01); *G06T 2207/30164* (2013.01)
(58) Field of Classification Search
  CPC . G06T 2207/30124; G06T 2207/10016; G06T 2207/30164; G06T 2207/10081
  See application file for complete search history.

(56) References Cited

U.S. PATENT DOCUMENTS

| | | | |
|---|---|---|---|
| 6,340,424 | B1 | 1/2002 | Elman et al. |
| 6,825,856 | B1 | 11/2004 | Fazzio et al. |
| 2007/0050064 | A1 | 3/2007 | Burgess et al. |
| 2010/0023157 | A1 | 1/2010 | Burgess et al. |
| 2013/0028478 | A1 | 1/2013 | St-Pierre et al. |
| 2014/0257543 | A1 | 9/2014 | Rhodes et al. |
| 2014/0257551 | A1 | 9/2014 | Junod et al. |
| 2014/0363054 | A1 | 12/2014 | Noriega Gil et al. |
| 2015/0160143 | A1 | 6/2015 | Henderkott et al. |
| 2016/0083305 | A1 | 3/2016 | Goetz et al. |
| 2016/0159698 | A1 | 6/2016 | Landwehr |
| 2016/0214907 | A1 | 7/2016 | Shim et al. |
| 2016/0300117 | A1* | 10/2016 | Yamamoto ........... G06K 9/4604 |
| 2017/0073277 | A1 | 3/2017 | Shim et al. |
| 2017/0313629 | A1 | 11/2017 | Shim et al. |
| 2018/0028413 | A1* | 2/2018 | Craig ...................... A61K 6/71 |
| 2018/0160932 | A1* | 6/2018 | Abkai ................. A61B 5/7278 |

OTHER PUBLICATIONS

U.S. Appl. No. 16/191,305, by Rolls-Royce Corporation (Inventor: Andrew James Ritchey), filed Nov. 14, 2018.

Maier et al., "Analysis of Woven Fabrics and Fiber Composite Material Aerospace Parts using Industrial CT Data", 5th International Symposium on NDT in Aerospace, Nov. 13-15, 2013, 7 pgs.

Dierig et al., "Fiber Composite Material Analysis in Aerospace Using CT Data", 4th International Symposium on NDT in Aerospace 2012, 6 pgs., Applicant points out, in accordance with MPEP 609.04(a), that the year of publication, 2012, is sufficiently earlier than the effective U.S. filing date, 2018, so that the particular month of publication is not in issue.

Sharma et al., "Image Based Finite Element Analysis of 3D-Orthogonal Carbon-Carbon (C/C) Composite", Proceedings of the World Congress on Engineering 2010 vol. II, WCE 2010, Jun. 30-Jul. 2, 2010, 5 pgs.

Green et al., "Mechanical modelling of 3D woven composites considering realistic unit cell geometry", Composite Structures, Jul. 24, 2014, 10 pgs.

Zhao, "Modeling and Rendering Fabrics at Micron-Resolution", Cornell University Dissertation, Aug. 2014, 217 pgs.

Dagaro, "Heterogeneous multi-sensor data fusion using geometric transformations and Parzen windows for the nondestructive evaluation of gas transmission pipelines", Rowan University Thesis, 2004, 155 pgs., Applicant points out, in accordance with MPEP 609.04(a), that the year of publication, 2004, is sufficiently earlier than the effective U.S. filing date, 2018, so that the particular month of publication is not in issue.

Chiou et al., "Model-Based Software for Simulating Ultrasonic Pulse/Echo Inspections of Metal Components", AIP Conference Proceedings 1806, Feb. 2017, 12 pgs.

* cited by examiner

Raw Image
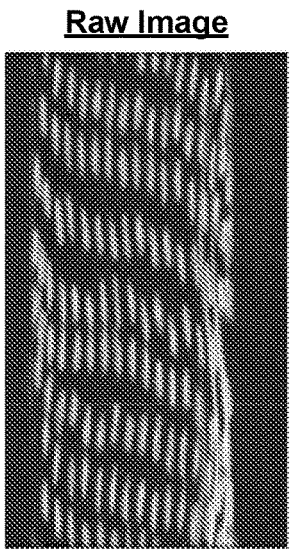
FIG. 4A
Crop/Threshold
Threshold/Crop
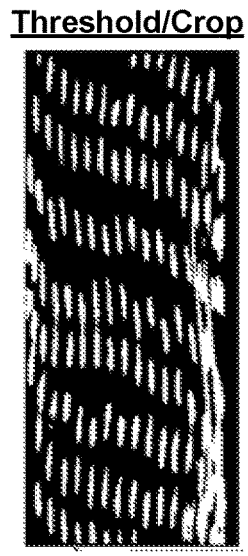
FIG. 4B
Identify Tows/Mark Centers
Tow Centers
FIG. 4C
Linearly Interpolate
Inter/Extrapolate
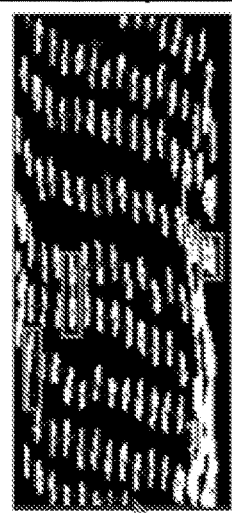
FIG. 4D
Apply Greyscale
Color Code
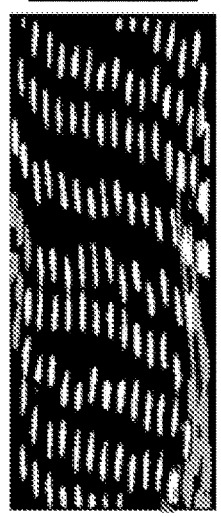
FIG. 4E
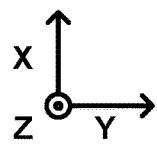

REPRESENTATION OF A COMPONENT USING CROSS-SECTIONAL IMAGES

This application claims the benefit of U.S. Provisional Application No. 62/599,305, filed Dec. 15, 2017, which is incorporated herein by reference in its entirety.

TECHNICAL FIELD

The disclosure relates to methods and systems for generating a representation of a component.

BACKGROUND

Industrial computed tomography (CT) scanning may be used to produce three-dimensional representations of scanned components. A component may be scanned by an irradiation source to generate cross-sectional images of the component at various intervals along a depth of the component. The cross-sectional images may be used to create the three-dimensional representation of the component. Industrial CT scanning may be used to inspect components for defects, measure internal sections of components, and generate models of prototypes.

SUMMARY

In some examples, the disclosure describes a method that includes receiving, by a controller, a cross-sectional image of a component at a perspective. The cross-sectional image includes a plurality of pixels representing the component. The method further includes determining, by the controller, a threshold color value. The method further includes setting, by the controller, an updated color value for each pixel of the plurality of pixels based on the threshold color value. The method further includes analyzing, by the controller, a set of adjacent pixels of the cross-sectional image. The set of adjacent pixels is selected based on a geometric parameter. The geometric parameter is based on an expected geometry of a physical domain of the component. The method further includes identifying, by the controller, a plurality of adjacent pixels from the set of adjacent pixels that is likely to be associated with the physical domain of the component based on the updated color values associated with the plurality of adjacent pixels. The component includes at least two physical domains. The method further includes outputting, by the controller, a representation of the component including the plurality of adjacent pixels that are likely to be associated with the physical domain.

In other examples, the disclosure describes a system that includes a controller. The controller is configured to receive a cross-sectional image of a component at a perspective. The cross-sectional image includes a plurality of pixels representing the component. The controller is further configured to determine a threshold color value and set an updated color value for each pixel of the plurality of pixels based on the threshold color value. The controller is further configured to analyze a set of adjacent pixels of the cross-sectional image. The set of adjacent pixels is selected based on a geometric parameter. The geometric parameter is based on an expected geometry of a physical domain of the component. The controller is further configured to identify a plurality of adjacent pixels from the set of adjacent pixels that is likely to be associated with the physical domain of the component based on the updated color values associated with the plurality of adjacent pixels. The component includes at least two physical domains. The controller is further configured to output a representation of the component including the plurality of adjacent pixels that are likely to be associated with the physical domain.

In other examples, the disclosure describes a computer-readable storage medium storing instructions that, when executed, cause a processor to receive a cross-sectional image of a component at a perspective. The cross-sectional image comprises a plurality of pixels representing the component. The instruction may further cause a processor to determine a threshold color value and set an updated color value for each pixel of the plurality of pixels based on the threshold color value. The instructions may further cause a processor to analyze a set of adjacent pixels of the cross-sectional image. The set of adjacent pixels is selected based on a geometric parameter. The geometric parameter is based on an expected geometry of a physical domain of the component. The instructions may further cause a processor to identify a plurality of adjacent pixels from the set of adjacent pixels that is likely to be associated with the physical domain of the component based on the updated color values associated with the plurality of adjacent pixels. The component comprises at least two physical domains. The instructions may further cause a processor to output a representation of the component including the plurality of adjacent pixels that are likely to be associated with the physical domain.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 4A is an example cross-sectional image of a woven material that includes tows.

FIG. 4B is an example cross-sectional image of a woven material that includes updated color values for a plurality of pixels.

FIG. 4C is an example cross-sectional image of a woven material that includes centers of pluralities of adjacent pixels.

FIG. 4D is an example cross-sectional image of a woven material that includes pluralities of adjacent pixels that are likely to be associated with tows that have been identified through interpolation or extrapolation.

FIG. 4E is an example cross-sectional image of a woven material that includes a representation of pluralities of adjacent pixels that are likely to be associated with tows.

DETAILED DESCRIPTION

Figure 1:
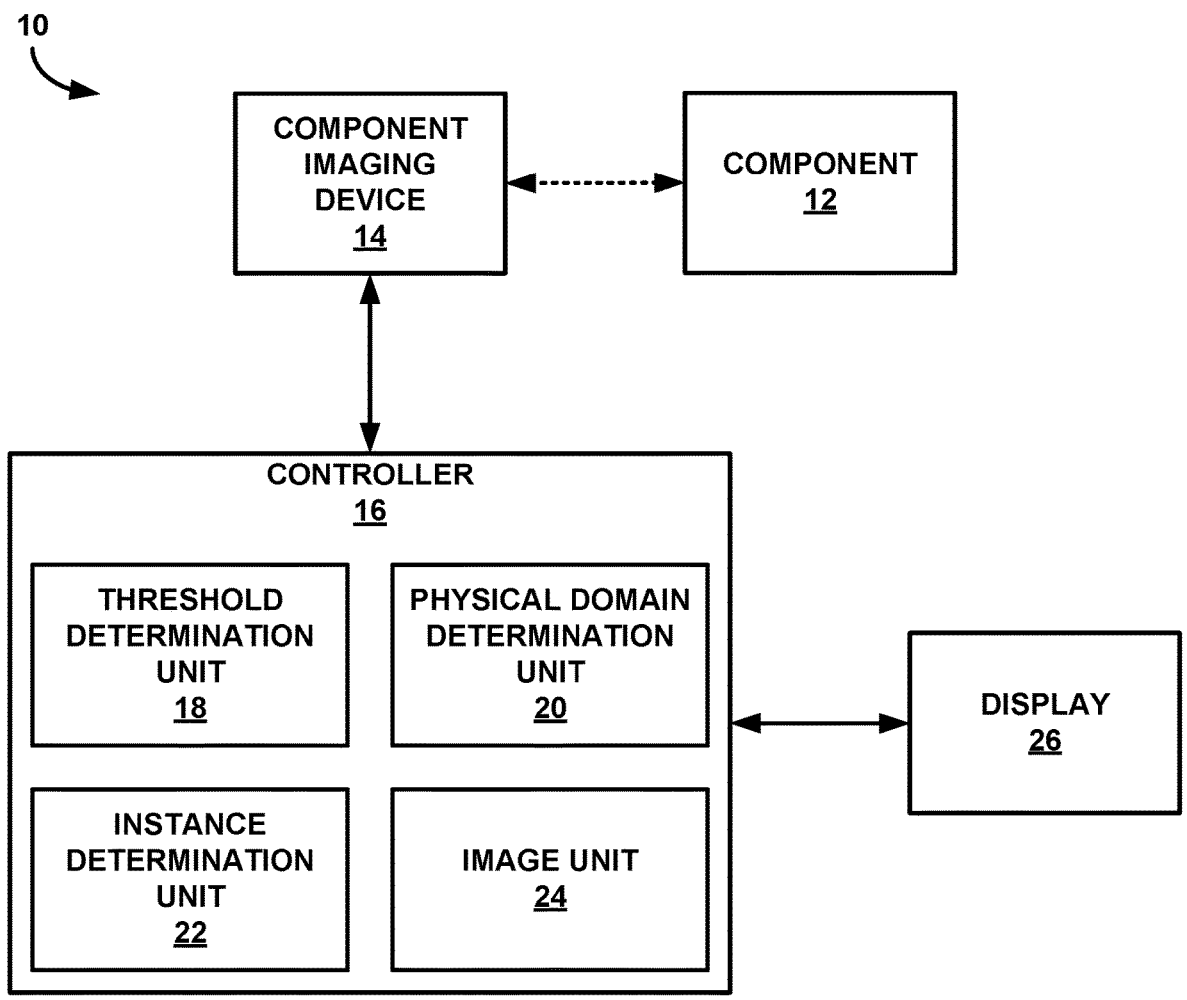
FIG. 1 is a conceptual and schematic block diagram illustrating an example system for generating a representation of a physical domain of a component from a cross-sectional image of component.

The disclosure describes systems and techniques for generating a representation of a physical domain of a component from one or more cross-sectional images of the component.

A component of a high temperature mechanical system may be scanned by imaging hardware to produce cross-sectional images of the component. Imaging software may identify groups of pixels of the images that are likely to correspond to instances of a same morphology of the component and produce a three-dimensional model of the component from the instances of the same morphology. For components that have more than one type of morphology, the imaging software may not be able to differentiate between morphologies based on the cross-sectional images. For example, in a woven material having two different orientations of tows, the tows may overlap and intertwine, such that the tows appear in the images to be joined. The imaging software may generate a model that appears to include only a single morphology, rather than two separate morphologies.

According to principles of the disclosure, a system may be configured to generate a representation of a morphology or physical domain of a component from a cross-sectional image of the component. The system may receive a cross-sectional image having pixels of various color values. The system may differentiate pixels of a particular physical domain from pixels of another physical domain or background by color value. The system may increase the contrast of the cross-sectional image by determining a threshold color value and using the threshold color value to set an updated color value for each pixel.

The system may further differentiate groups of pixels of the particular physical domain from groups of pixels of another physical domain using a geometric parameter. The geometric parameter may be correlated to expected physical dimensions of an instance of a physical domain. For example, in a woven material, the geometric parameter may be related to a size and/or aspect ratio of a tow. Due to the perspective from which the cross-sectional images were captured, the cluster of pixels that correspond to the physical domain may have different dimensions than the cluster of pixels that correspond to another physical domain having the same physical dimensions, but different orientation. For example, a tow oriented in a direction perpendicular to the plane of the cross-sectional image may have a lower aspect ratio when viewed in the cross-sectional image than a tow oriented in a direction parallel to the plane of the cross-sectional image.

The system may further differentiate clusters of pixels of a particular instance of the physical domain from clusters of pixels of another instance of the physical domain using a geometric parameter. The geometric parameter may also be correlated to physical dimensions of an instance of a physical domain, but may represent an anticipated position or change in physical dimension based on a geometry of the instance of the physical domain. For example, in a woven material, the geometric parameter may be related to variation in the weave of a tow as the tow extends through the woven material. In this way, the system is configured to utilize prior knowledge regarding the geometry of physical domains of the component in processing the images.

The system may further compensate for pixels that may not have been identified as associated with a particular instance of the physical domain by identifying unidentified sections of the instance of the physical domain and including pixels based on an anticipated position of the unidentified sections of the instance of the physical domain. For example, in a woven material, two tows of a same orientation may touch at a particular depth in the component, such that a cross-sectional image at the particular depth may not represent the two tows as being separate. The system may include the unidentified sections of the instance based on interpolation or extrapolation of clusters of pixels representing the unidentified sections of the instance using pixel positions of the identified sections of the instance from adjacent cross-sectional image slices.

By generating a representation of a physical domain of a component from a cross-sectional image of the component using geometric parameters related to expected physical dimensions of physical domains of the component, a system may provide more accurate representations of the component for modeling of the component than when generating a representation without using prior knowledge regarding physical domains of the component.

FIG. 1 is a conceptual and schematic block diagram illustrating an example system 10 for generating a representation of a physical domain of a component 12 from a cross-sectional image of component 12. System 10 includes a controller 16 and, optionally, a component imaging device 14 communicatively coupled to controller 16. System 10 also includes an optional display 26 communicatively coupled to controller 16.

Component 12 may be any component of a system. In some examples, component 12 may be a component of a high temperature mechanical system. The high temperature mechanical system may be any high temperature mechanical system including, but not limited to, gas turbine engines such as turboprops, turbofans, turboshafts, turbojets, and the like.

Component 12 includes at least two physical domains. A physical domain may be a portion of component 12 defined by a collection of physical properties, such as morphology, composition, phase, density, orientation, material continuity, material bundling, or the like. In some examples, component 12 may have multiple instances of each physical domain of the at least two physical domains. An instance may include any separate or discrete occurrence of a physical domain. For example, in a dispersion, a dispersion medium may represent a first physical domain and each dispersed particle may represent an instance of a second physical domain.

In some examples, component 12 may include a woven material that includes a first plurality of tows oriented in a first direction, a second plurality of tows oriented in a second direction, and a matrix material encapsulating or surrounding the first and second plurality of tows. The first plurality of tows may be a first physical domain and the second plurality of tows may be a second physical domain. The matrix material may be a third physical domain. In some examples, the plurality of tows oriented in the first direction and second direction are made from a same composition, and the composition of the tows may be the same as or different from the composition of the matrix material.

Figure 2A:
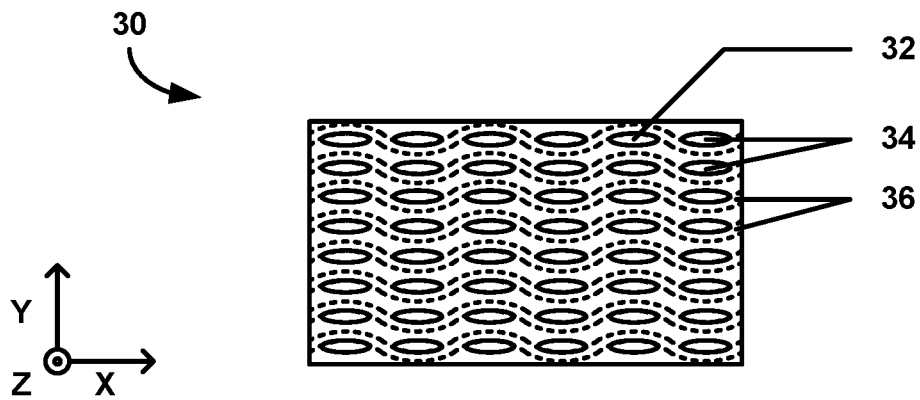
FIG. 2A is a cross-sectional diagram of a woven material that includes a first plurality of tows interwoven with a second plurality of tows.

For example, FIG. 2A is a cross-sectional diagram of a woven material 30 that includes a first plurality of tows 34 and a second plurality of tows 36. The first plurality of tows 34 may be generally oriented in a direction along the z-axis (substantially perpendicular to the plane of page), while the second plurality of tows 36 may be generally oriented in a direction along the y-axis.

When analyzed as a cross-section, each instance of a physical domain of component 12 may include at least one cross-sectional dimension in a selected plane. The at least one cross-sectional dimension may include any cross-sectional dimension of a structural feature of a particular instance of the physical domain at a perspective. For example, in a cross-sectional image at a perspective, the cross-sectional dimension may be a dimension in the plane of the cross-sectional image. In some examples in which an instance of a first physical domain and an instance of a second physical domain have similar structural features, but in which the first and second physical domains are at different orientations, the at least one cross-sectional dimension of the instance of the first physical domain may be a dimension that, when viewed from a particular perspective, is different from a cross-sectional dimension of the instance of the second physical domain at the particular perspective due to the different orientations. For example, a cylindrical structure may have a circular cross-section from a first perspective and a rectangular cross-section from a second perspective. Cross-sectional dimensions may include, but are not limited to, a cross-sectional width, a cross-sectional height, a cross-sectional area, a cross-sectional aspect ratio, and the like.

Figure 2B:
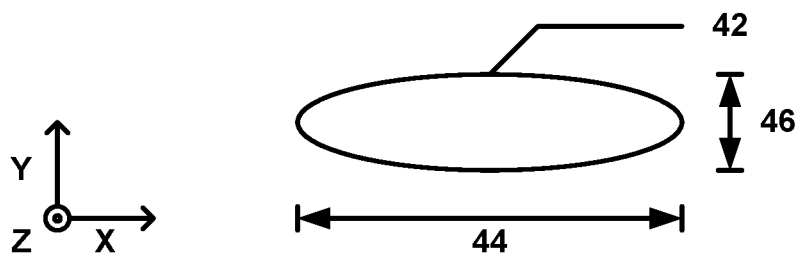
FIG. 2B is cross-sectional diagram of a tow of the plurality of tows of FIG. 2A.

For example, FIG. 2B is cross-sectional diagram of a tow 42 of the plurality of tows 34 of FIG. 2A. Tow 42 has a cross-section width 44 along the x-axis, a cross-sectional height 46 along the y-axis, an area (approximately width 44×height 46×π/4), and an aspect ratio (width 44:height 46). A height 46 of tow 42 may be similar to a height of a perpendicular tow of the second plurality of tows 36 in the perspective shown in FIG. 2A, but width 44, area, and aspect ratio of tow 42 may be different than a width, area, and aspect ratio, respectively, of a tow of the second plurality of tows 36 due to the perspective along the z-axis.

In some examples, a cross-sectional dimension or reference position of an instance of the physical domain, such as a width or center point, at a first cross-section of component 12 may be different than a cross-sectional dimension or position at a second cross-section of component 12 along the same perspective. For example, the instance of the physical domain may extend through the component as a weave or taper through the component. As such, each instance of a physical domain of component 12 may include at least one cross-sectional dimension or reference position that may be dependent on a change in position perpendicular to the cross-sectional plane of the cross-sectional dimension or position. Within a single cross-section of the instance of the physical domain at a cross-section location, this change in cross-section dimension or position may be expressed as an anticipated cross-section dimension or position of the instance at the particular cross-section location. The change in position perpendicular to the cross-sectional may include any geometric dimension or reference position of a structural feature of a particular instance of the physical domain at a perspective that is perpendicular to the at least one cross-sectional dimension. In some examples, the at least one geometric dimension may include a position or dimension, or a change in a position or dimension, of a particular instance of the physical domain along the perspective. Geometric dimensions may include, but are not limited to, a position or a change in a position, such as a center or edge position; a dimension or a change in a dimension, such as a width, height, area, or aspect ratio; and the like.

Figure 2C:
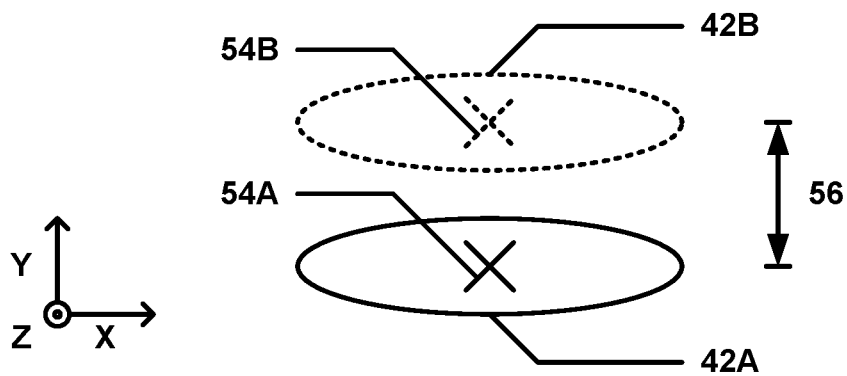
FIG. 2C is a cross-sectional diagram of a first portion of a tow at a first z-axis position (depth into the page) and a second portion of a tow at a second z-axis position at the perspective shown in FIG. 2A.

For example, FIG. 2C is a cross-sectional diagram of a first portion 42A of tow 42 at a first z-axis position (depth into the page) as represented in a first cross-section and a second portion 42B of tow 42 at a second z-axis position as represented in a second cross-section at the perspective shown in FIG. 2A. The first portion 42A of tow 42 at the first z-axis position may have a center point 54A at a first position along the y-axis and the second portion 42B of tow 42 at the second z-axis position may have a center point 54B at a second position along the y-axis. A difference 56 in y-axis position at different z-axis positions may represent a reciprocal motion of tow 42 along the z-axis due to the weaved structure of woven material 30.

While component 12 has been illustrated as woven material 30, component 12 may include other materials. For example, component 12 may be a dispersion that includes a matrix that includes a plurality of first spherical particles, representing a first physical domain, and a plurality of second spherical particles, representing a second physical domain. The plurality of first particles may have a cross-sectional dimension of a first radius and a geometric dimension of a change in the first radius with respect to a change in z-axis position. The plurality of second particles may have a cross-sectional dimension of a second radius and a change in cross-sectional dimension with respect to a change in position along the perspective of a change in the second radius with respect to a change in z-axis position, where the second radius and change in the second radius are different than the first radius and the change in first radius.

In some examples, system 10 includes component imaging device 14. Component imaging device 14 may be configured to generate a cross-sectional image of component 12 at a perspective. A cross-sectional image may include any image that represents a cross-section of component 12 at a depth or surface, such as a surface image, an image of a section of component 12, or the like. The cross-sectional image of component 12 may include a plurality of pixels representing the component. Each pixel of the plurality of pixels may have an associated color value.

Component imaging device 14 may be configured to emit imaging waves at component 12 and detect reflected or transmitted imaging waves from component 12. Component imaging device 14 may use a variety of imaging techniques to generate the cross-sectional image of component 12 including, but not limited to, thermography, radiography, ultrasonography, photography, and any other imaging technique that may be configured to generate images of a surface or cross-section of component 12.

In some examples, the cross-sectional image of component 12 may be a tomographic representation of component 12. A tomographic representation may be an x-axis and y-axis representation of component 12 associated with a z-axis position of a depth of component 12 along the perspective. For example, the cross-sectional image of component 12 may be defined parallel to a plane defined by the x-axis and a y-axis, while the perspective may be defined along the z-axis perpendicular to the plane of the cross-sectional image. The cross-sectional image of component 12 may represent a cross-section of component 12 at a particular depth of component 12 along the perspective. In some examples, the cross-sectional image of component 12 may by one of a series of cross-sectional images of component 12. Each cross-sectional image in the series of cross-sectional images may represent a cross-section of component 12 at a different depth along the perspective, such that the series proceeds in a direction along the perspective. For example, component imaging device may be configured to generate a plurality of cross-sectional images of component 12 at different depths along the perspective. In other examples, the perspective may be along a different axis (e.g., x-axis or y-axis) or an intermediate position not parallel to any of the axes.

Component imaging device 14 may be communicatively coupled to controller 16 and configured to output the cross-sectional image of component 12 to controller 16. For example, component imaging device 14 may be configured to send an image signal to controller 16 that represents the cross-sectional image of component 12 at the perspective. In some examples, component imaging device 14 may be configured to receive command signals from a controller, such as controller 16. For example, component imaging device 14 may be configured to receive a scan signal from controller 16 that includes a scanning pattern, such as a depth increment, and generate the cross-sectional image of component 12 based on the scan signal.

System 10 includes controller 16. Controller 16 may be communicatively coupled to component imaging device 14 and display 26. Controller 16 may be configured to receive a cross-sectional image of component 12 at a perspective or a plurality of perspectives. For example, controller 16 may be configured to receive an image signal from component imaging device 14 that includes the cross-sectional image of component 12 at the perspective. In some examples, the image signal may include a series of cross-sectional images of component 12 along the perspective. Controller 16 may be configured to determine a representation of component 12 from the cross-sectional image of component 12, as will be explained in FIG. 3 below. Controller 16 may be configured to output the representation of component 12 to display 26. For example, controller 16 may be configured to send a display signal to display 26 that includes the representation of component 12.

Controller 16 also may be communicatively coupled to and configured to control other components of system 10. For example, controller 16 may be configured to cause component imaging device 14 to generate the cross-sectional image of component 12. In some examples, controller 16 may be communicatively coupled to storage systems outside system 10. For example, controller 16 may be communicatively coupled to storage systems that store cross-sectional images of component 12, such that controller 16 may send a request to the systems to retrieve the cross-sectional images of component 12. Controller 16 may include any one or more of a wide range of devices, including processors (e.g., one or more microprocessors, one or more application specific integrated circuits (ASICs), one or more field programmable gate arrays (FPGAs), or the like), one or more servers, one or more desktop computers, one or more notebook (i.e., laptop) computers, one or more cloud computing clusters, or the like.

Controller 16 may include threshold determination unit 18, physical domain determination unit 20, instance determination unit 22, and image unit 24. Threshold determination unit 18, physical domain determination unit 20, instance determination unit 22, and image unit 24 may perform operations described using software, hardware, firmware, or a mixture of hardware, software, and firmware residing in and/or executing at controller 16. Threshold determination unit 18, physical domain determination unit 20, instance determination unit 22, and image unit 24 may execute as one or more services of an operating system or at an application layer of a computing platform of controller 16.

Threshold determination unit 18 may execute one or more techniques for assigning pixels to one of two color groups based on a threshold color value and a respective color value associated with each pixel. Each of the plurality of pixels may have an associated color value. Threshold determination unit 18 may use the threshold color value to increase a contrast of the cross-sectional image by differentiating between a color value range associated with a physical domain and a color value range that is not associated with the physical domain, such as a color value associated with a background or a second physical domain.

Physical domain determination unit 20 may select a set of adjacent pixels of the cross-sectional image for analysis based on a geometric parameter. The geometric parameter may be based on an expected geometry of an instance of a physical domain of the component, such as a predicted or known physical dimension of an instance of the physical domain. The geometric parameter may be used to set a size or shape of a "search window" for the set of adjacent pixels so that a plurality of adjacent pixels that are likely to be associated with the physical domain may be analyzed in the "search window".

In some examples, the geometric parameter may define a size or shape of a pixel region that includes a set of adjacent pixels of the cross-sectional image. For example, the geometric parameter may define a "window" of a height and a width measured in pixels. The geometric parameter may be selected based on pixel dimensions of the pixel region that correspond to predicted or known physical dimensions, such as a size or shape, of an instance of a physical domain of component 12, as discussed above. For example, the "window" may have a width and height in pixels that corresponds to or is slightly greater than a maximum or near-maximum width and height of a tow of the woven material. The pixel region may correspond to physical dimensions by representing an average of the physical dimensions for a plurality of instances of the physical domain, a maximum of a range of the physical dimensions for the plurality of instances of the physical domain, or the like.

In some examples, the geometric parameter may be selected to define a maximum width and/or height in pixels so that a plurality of adjacent pixels that is likely to be associated with the physical domain may fit into the pixel region defined by the geometric parameter and a plurality of adjacent pixels that is not likely to be associated with the physical domain may not fit into the pixel region defined by the geometric parameter. For example, the rectangular "window" may fit the oval or disc shape of pixels that represent the tows running along the perspective, but may not fit an elongated serpentine shape of pixels that represent the tows running perpendicular to the perspective. While the pixel region has been described with reference to a rectangular "window", a variety of shapes may be used for a geometric parameter that defines the pixel region. For example, if a cross-section of an instance of a physical domain has a crescent shape, one or more geometric parameters may be selected to define a pixel region that would substantially fit a plurality of adjacent pixels that have the crescent shape while excluding a plurality of pixels that does not have the crescent shape.

Geometric parameters that may be used include, but are not limited to, a height, a width, an aspect ratio, a shape, separation between groups of pixels, continuity of groups of pixels between cross-sectional images, and the likes. Factors for selecting a geometric parameter include, but are not limited to, predicted or known spacing of instances of the physical domain, predicted or known shape of instances of the physical domain, predicted or known orientations of instances of the physical domain, predicted or known distribution of instances of the physical domain, and the like. In some examples, the geometric parameter may be based on a predicted or known average physical dimension of a plurality of instances of the physical domain. For example, for a woven material that includes tows having an oval shape with a median width of 20 pixels and a median height of 10 pixels at a particular resolution of the cross-sectional image, the geometric parameter may define a tow width of 30 pixels and a tow height of 15 pixels so that at least one set of adjacent pixels may include pixels corresponding to each instance or most instances of the physical domain.

Image unit 24 may determine a representation of component 12 that includes a plurality of adjacent pixels representing an instance of a physical domain. In some examples, image unit 24 may determine the representation of component 12 by differentiating between pluralities of adjacent pixels that are likely to be associated with an instance of a physical domain and pluralities of adjacent pixels that are not likely to be associated with the instance of the physical domain by determining a color of each of the pluralities of adjacent pixels. For example, image unit 24 may assign a first color value to pluralities of adjacent pixels that are determined as likely to be associated with the physical domain and a second color value to pluralities of adjacent pixels that are not determined as likely to be associated with the physical domain.

In some examples, imaging unit 24 may determine whether the plurality of adjacent pixels is likely to be associated with the component based on a distribution parameter associated with a distribution of the physical domains in the material. The distribution parameter may represent a volume fraction of each physical domain, such as a number of pixels in the physical domain per the total number of pixels. For example, the distribution parameter may be a percentage of the pluralities of adjacent pixels that are likely to be associated with the component that have a particular value of geometric parameter. In some instances, the volume fraction of a physical domain of component 12 may be significantly different when viewed from different perspectives, such that the volume fraction may be used to further determine whether a plurality of adjacent pixels is likely to be associated with a particular domain. To determine whether the plurality of adjacent pixels is likely to be associated with the component based on the distribution parameter, controller 16 may determine a range of values of the geometric parameter associated with the distribution parameter. Controller 16 may adjust the geometric parameter and evaluate each plurality of adjacent pixels with respect to the adjusted geometric parameter until the percentage of pluralities of adjacent pixels that meet the adjusted geometric parameter is below the distribution parameters. Controller 16 may update the color values of the corresponding pluralities of adjacent pixels to indicate that the pluralities of adjacent pixels are within the distribution parameter. Further details regarding operation of threshold determination unit 18, physical domain determination unit 20, instance determination unit 22, and image unit 24 will be described below with reference to FIGS. 3-5.

System 10 may include display 26. Display 26 may be communicatively coupled to controller 16 and configured to receive the representation of component 12 from controller 16. For example, display 26 may receive a display signal from controller 16 that includes the representation of component 12.

Figure 3:
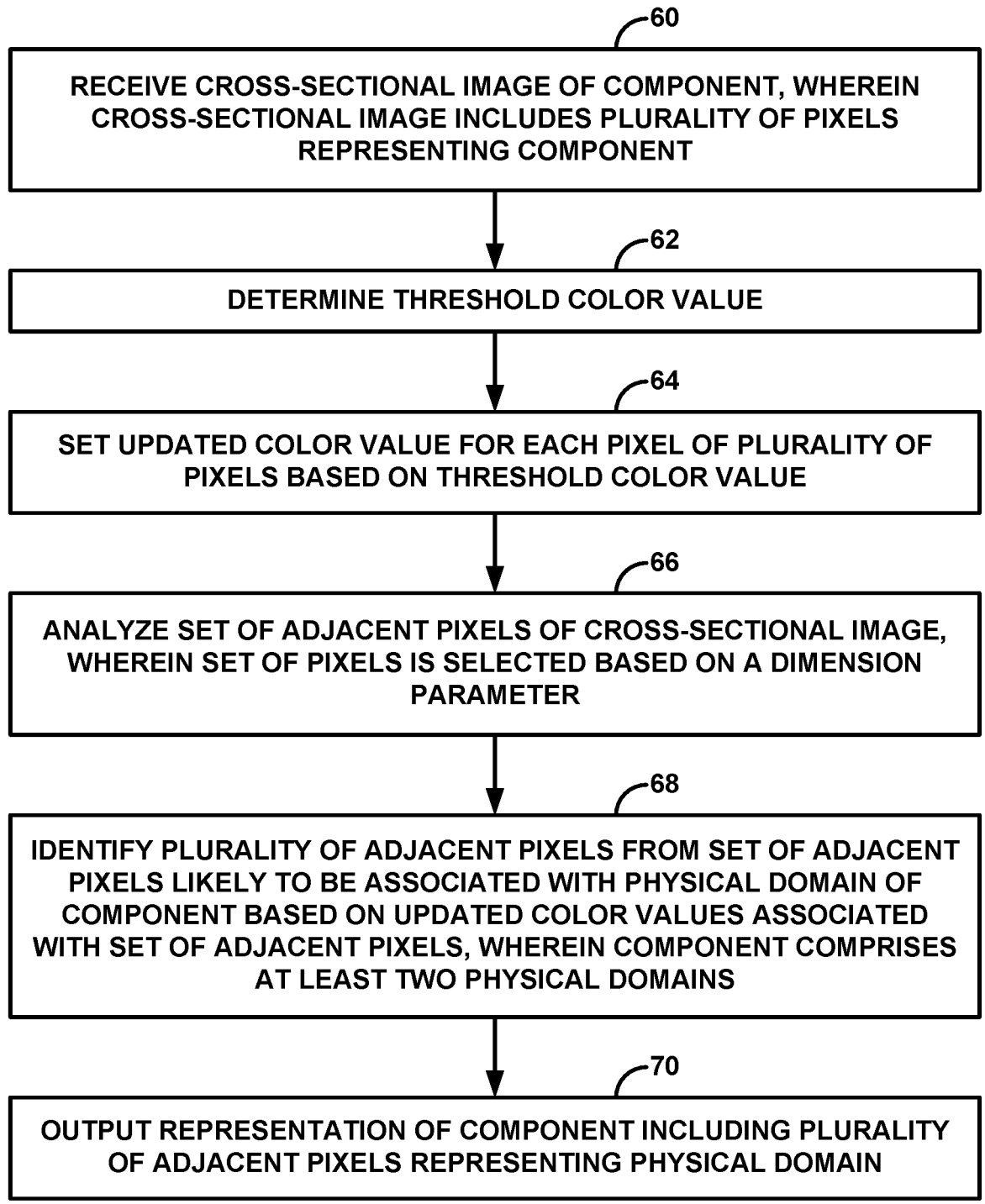
FIG. 3 is a flow diagram illustrating an example technique for generating a representation of a physical domain of a component from a cross-sectional image of the component.

FIG. 3 is a flow diagram illustrating an example technique for generating a representation of a physical domain of a component from a cross-sectional image of the component. The technique of FIG. 3 will be described with concurrent reference to system 10 of FIG. 1, although one of ordinary skill will understand that the technique of FIG. 3 may be performed by other systems that include a greater or fewer number of components, and that system 10 may perform other techniques. For example, one or more control steps performed by controller 16 may be performed using another component of system 10.

Controller 16 may receive a cross-sectional image of component 12 at a perspective (60). The cross-sectional image of component 12 includes a plurality of pixels representing component 12. Controller 16 may determine x-axis and y-axis coordinates for each pixel of the plurality of pixels, or the pixels may already be associated with respective x-axis and y-axis coordinates, e.g., the plurality of pixels may be associated with respective x-axis and y-axis coordinates by component imaging device 14. In some examples, the cross-sectional image may be one of a series of cross-sectional images of component 12, such that the cross-sectional image may include a z-axis coordinate for each pixel of the plurality of pixels, and the z-axis coordinate may be different for each cross-sectional image in the series of cross-sectional images.

In some examples, controller 16 may receive the cross-sectional image of component 12 from component imaging device 14. For example, component imaging device 14 may be communicatively coupled to controller 16 and may send a signal to controller 16 that includes the cross-sectional image of component 12 (e.g., data representative of the cross-sectional image). In some examples, controller 16 may cause component imaging device 14 to capture the cross-sectional image of component 12. For example, controller 16 may send a signal to component imaging device 14 to cause component imaging device 14 to scan component 12 and generate a cross-sectional image of component 12 (e.g., an instruction causing component imaging device 14 to scan component 12 and generate a cross-sectional image of component 12). In some examples, controller 16 may receive the cross-sectional image of component 12 from a computing system, such as an image database that includes cross-sectional images of component 12. For example, controller 16 may receive a user input that specifies a location of a file that includes the cross-sectional image and, in response to receiving the user input, send a request to a computing system for the cross-sectional image of component 12 to cause the computing system to make the cross-sectional image of component 12 accessible to controller 16.

FIG. 4A is an example cross-sectional image of a woven material that includes tows in two different orientations. The woven material may include a first physical domain of tows extending through the woven material in a first direction and a second physical domain of tows extending across the woven material in a second direction perpendicular to the first direction. The cross-sectional image of the woven material includes a plurality of pixels that represent the component. For example, the pixels having a lighter color value may represent tows in the first or second direction, while pixels having a darker color value may represent air or a matrix material substantially encapsulating the tows.

In some examples, controller 16 may receive input parameters, as will be described below. For example, controller 16 may be coupled to a user interface and may receive a user input that includes the input parameters. Parameters may include a color value threshold parameter, a geometric parameter, a distribution parameter, and other parameters, as will be explained below.

Once controller 16 has received the cross-sectional image of component 12, controller 16 may prepare the cross-sectional image of component 12 for processing. In some examples, controller 16 may crop an area of the cross-sectional image to be evaluated to focus on a region of interest that includes physical domains of interest. For example, the cross-sectional image may include a large number of pixels in a background area that are not associated with a physical domain of interest. Controller 16 may identify boundaries of the physical domains of interest in the cross-sectional image and reduce an area of the cross-sectional image of component 12.

Controller 16, such as threshold determination unit 18, may determine a threshold color value for a plurality of pixels (62). The cross-sectional image may include a plurality of pixels representing component 12. Each of the plurality of pixels may have an associated color value. Threshold determination unit 18 may use the threshold color value to increase a contrast of the cross-sectional image by differentiating between a color value range associated with a physical domain and a color value range that is not associated with the physical domain, such as a color value associated with a background or a second physical domain.

Threshold determination unit 18 may use any suitable thresholding technique to determine the threshold color value. In some examples, threshold determination unit 18 may determine the threshold color value based on color values associated with the plurality of pixels. For example, threshold determination unit 18 may determine the threshold color value based on a distribution of the color values of pixels of the plurality of pixels. For example, the distribution of color values for a component having two compositions, such as a physical domain and air, may have a bimodal distribution of color values, such that pixels corresponding to air may have a dark color value and pixels corresponding to the physical domain may have lighter color values. Threshold determination unit 18 may identify a color value between the two bimodal peaks, such as a minimum or near minimum distribution, as the threshold color value. In some examples, threshold determination unit 18 may receive a threshold color value input from a user. For example, threshold determination unit 18 may output a representation of the cross-sectional image to display 26 and a user may input the threshold color value to threshold determination unit 18 based on a visual inspection of the color values associated with the plurality of pixels. In some examples, threshold determination unit 18 may receive a threshold color value, such as from a user using a graphical user interface to input the threshold color value or specify a file location that includes the threshold color value. For example, the threshold color value may be selected based on known or predicted color values based on composition of physical domains of the component.

Threshold determination unit 18 may set an updated color value for each pixel of the plurality of pixels based on the threshold color value (64) to form a thresholded cross-sectional image. Threshold determination unit 18 may compare the color value of each pixel of the plurality of pixels against the threshold color value and determine whether the color value is greater than or less than the threshold color value. If the color value of the pixel is greater than the threshold color value, threshold determination unit 18 may assign the pixel a value "0" and set an updated color value for the pixel that is associated with the value "0", such as a color value for the color "black". If the color value of the pixel is less than the threshold color value, controller 16 may assign the pixel a value "1" and set an updated color value for the pixel that is associated with the value "1", such as a color value for the color "white".

While steps 32 and 34 discussed above have been described in terms of two ranges (above the threshold color value and below the threshold color value), in other examples, threshold determination unit 18 may set updated color values for a plurality of pixels based on more than two ranges. For example, for color values in an 8-bit greyscale cross-sectional image of a component having four distinct compositions, threshold determination unit 18 may determine four color value ranges based on a distribution of the color values of the cross-sectional image, where each color value range may be associated with a range that is likely to include one of the four distinct compositions. Threshold determination unit 18 may set an updated color value for each pixel of the plurality of pixels based on the color value ranges. Threshold determination unit 18 may determine the color value range of the four color value ranges that each pixel of the plurality of pixels is within and set an updated color value based on the determined color value range.

FIG. 4B is a cross-sectional image of the woven material discussed in FIG. 4A that includes updated color values for the plurality of pixels. The lighter color values have been updated to white, while the darker color values have been updated to black. In this way, the thresholded cross-sectional image shown in FIG. 4B exhibits higher contrast than the original image in FIG. 4A, which may facilitate subsequent analysis of the image.

The cross-sectional image of component 12 may include one or more pluralities of adjacent pixels that have a same updated color value. Each plurality of adjacent pixels having the same updated color value may be bounded by and separated from another plurality of adjacent pixels having the same updated color value by pixels having a different updated color value. At least a portion of the one or more pluralities of adjacent pixels that have the same updated color value may be associated with a physical domain of component 12. For example, as seen in FIG. 4B, the cross-sectional image of the woven material includes multiple pluralities of white adjacent pixels bounded and separated by black pixels.

An instance of the physical domain, such as a tow of a woven material, may have one or more physical dimensions, such as a height, width, or aspect ratio, that define a size or shape of the instance of the physical domain. Each of the one or more physical dimensions of the instance of the physical domain may be associated with one or more pixel dimensions of the plurality of adjacent pixels of the cross-sectional image of component 12. In the example of FIG. 2B, width 44 and height 46 of tow 42 may be associated with a width and a height, respectively, of a plurality of adjacent pixels of a cross-sectional image corresponding to tow 50.

Controller 16, such as physical domain determination unit 20, may select a set of adjacent pixels of the cross-sectional image for analysis based on a geometric parameter. The geometric parameter may be based on predicted or known physical dimensions of the instance of the physical domain. The geometric parameter may be used to set a size or shape of a "search window" for the set of adjacent pixels so that a plurality of adjacent pixels that are likely to be associated with the physical domain may be analyzed in the "search window".

In some examples, the geometric parameter may define a size or shape of a pixel region that includes a set of adjacent pixels of the cross-sectional image. For example, for a cross-sectional image such as shown in FIG. 4B, the geometric parameter may define a "window" of a height and a width. The geometric parameter may be selected based on pixel dimensions of the pixel region that correspond to physical dimensions, such as a size or shape, of an instance of a physical domain of component 12, as discussed above. In the above example of FIG. 4B, the "window" may have a width and height in pixels that corresponds to a maximum or near-maximum width and height of a tow of the woven material of the cross-sectional image of FIG. 4B. The pixel region may correspond to physical dimensions by representing an average of the physical dimensions for a plurality of instances of the physical domain, a maximum of a range of the physical dimensions for the plurality of instances of the physical domain, and the like.

In some examples, the geometric parameter may be selected to define a maximum width and/or height so that a plurality of adjacent pixels that is likely to be associated with the physical domain may fit into the pixel region defined by the geometric parameter and a plurality of adjacent pixels that is not likely to be associated with the physical domain may not fit into the pixel region defined by the geometric parameter. In the above example of FIG. 4B, the rectangular "window" may fit the oval or disc shape of the tows running along the perspective, but may not fit an elongated serpentine shape of the tows running perpendicular to the perspective. While the pixel region has been described with reference to a rectangular "window", a variety of shapes may be used for a geometric parameter that defines the pixel region. For example, if a cross-section of an instance of a physical domain has a crescent shape, one or more geometric parameters may be selected to define a pixel region that would fit a plurality of adjacent pixels that have the crescent shape while excluding a plurality of pixels that do not have the crescent shape.

Geometric parameters that may be used include, but are not limited to, a height, a width, an aspect ratio, a shape, separation between groups of pixels, continuity of groups of pixels between cross-sectional images, and the like, as measured in pixels. Factors for selecting a geometric parameter include, but are not limited to, predicted or known spacing of instances of the physical domain, predicted or known shapes of instances of the physical domain, predicted or known orientations of instances of the physical domain, predicted or known distribution of instances of the physical domain, and the like. In some examples, the geometric parameter may be based on an average physical dimension of a plurality of instances of the physical domain. For example, for a woven material that includes tows having an oval shape with a median width of 20 pixels and a median height of 10 pixels at a particular resolution of the cross-sectional image, the geometric parameter may define a width of 30 pixels and a height of 15 pixels so that at least one set of adjacent pixels may include pixels corresponding to each instance or most instances of the physical domain.

Physical domain determination unit 20 may analyze the set of adjacent pixels of the cross-sectional image (66) to determine whether the set of adjacent pixels includes a plurality of adjacent pixels likely to be associated with the physical domain of component 12. In some examples, physical domain determination unit 20 may determine whether the set of adjacent pixels of the cross-sectional image includes a plurality of adjacent pixels having an updated color value associated with the physical domain. Presence of adjacent pixels having the updated color value in, for example, the pixel region may indicate that the pixel region includes pixels associated with a physical domain. For example, for a cross-sectional image such as shown in the example of FIG. 4B, physical domain determination unit 20 may determine whether the plurality of adjacent pixels in the "window" have a plurality of pixels having a white color value, as the white color value is associated with the physical domain of component 12.

In some examples, physical domain determination unit 20 may further differentiate the plurality of adjacent pixels based on the geometric parameter. In some examples, physical domain determination unit 20 may determine whether the plurality of adjacent pixels having the updated color value associated with the physical domain fit into the pixel region. In the example of FIG. 4B discussed above, physical domain determination unit 20 may evaluate whether a plurality of pixels having at least one pixel that includes a white color value fit into the "window", so as to differentiate that particular plurality of adjacent pixels from a plurality of adjacent pixels of the same color value (i.e. composition), but representing another physical domain, such as a perpendicular tow.

In some examples, physical domain determination unit 20 may determine whether the plurality of adjacent pixels fit into the pixel region by determining whether the set of adjacent pixels includes a border of pixels that have a color value that is not associated with the physical domain of component 12. In the example of FIG. 4B above, to determine whether the set of adjacent pixels includes a plurality of pixels likely to be associated with the physical domain, physical domain determination unit 20 may determine whether a plurality of pixels that are not on a border of the set of adjacent pixels have a white color value, which is associated with the physical domain, and whether any pixels on a border of the set of adjacent pixels have a white color value. Presence of a pixel on a border having a color value that is associated with the physical domain may indicate that the plurality of adjacent pixels having un updated color value associated with the physical domain may be associated with a different physical domain that has a same or similar composition as the target physical domain, but that may not meet the geometric parameter associated with predicted or known physical dimensions of the physical domain of component 12.

In some examples, physical domain determination unit 20 may analyze the set of adjacent pixels by determining whether a plurality of adjacent pixels in the set of adjacent pixels has a minimum or relative pixel dimension that corresponds to a predicted or known minimum or relative physical dimension of an instance of the physical domain. For example, even though a plurality of adjacent pixels may fit into a pixel region defined by a geometric parameter, the pixel region may define maximum pixel dimensions, such as a height and/or width in pixels. The plurality of adjacent pixels may have dimensions, such as a height or width, that are not above a minimum dimension, or may have a relative dimension, such as an aspect ratio, that is not within a range of relative dimensions that indicate that the plurality of adjacent pixels is likely to be associated with the physical domain. Physical domain determination unit 20 may identify one or more dimensions of the plurality of adjacent pixels by identifying a height, width, area, and/or aspect ratio of the plurality of adjacent pixels. For example, physical domain determination unit 20 may identify an upper and lower x-coordinate limit of x-coordinates of pixels in the plurality of adjacent pixels and an upper and lower y-coordinate limit of y-coordinates of pixels in the plurality of adjacent pixels that represent a height and width, respectively, of the plurality of adjacent pixels. Physical domain determination unit 20 may compare at least one of the height, the width, and the aspect ratio of the plurality of adjacent pixels to a geometric parameter corresponding to physical dimensions of an instance of the physical domain. For example, a plurality of tows may have predicted or known aspect ratios between 1:5 and 1:8, such that physical domain determination unit 20 may determine whether the plurality of adjacent pixels having an updated color value associated with the physical domain have an aspect ratio between 1:5 and 1:8.

Physical domain determination unit 20 may identify a plurality of adjacent pixels from the set of adjacent pixels that is likely to be associated with a physical domain of component 12 based on the updated color values associated with the set of adjacent pixels (68). For example, physical domain determination unit 20 may determine from the analysis described in step 66 above that the set of adjacent pixels includes a plurality of adjacent pixels that have an updated color value associated with the physical domain, and that the plurality of adjacent pixels fits into the region defined by the geometric parameter, has a dimension above a minimum geometric parameter, and/or has a relative dimension within a range of relative dimensions associated with a plurality of adjacent pixels likely to be associated with the physical domain.

In some examples, physical domain determination unit 20 may not identify, from the set of adjacent pixels, a plurality of adjacent pixels that is likely to be associated with the physical domain of component 12 based on the updated color values associated with the plurality of adjacent pixels. For example, the set of adjacent pixels may not include a pixel having an updated color value associated with the physical domain, or a plurality of adjacent pixels that have updated color values associated with the physical domain may not fit in the pixel region defined by the geometric parameter.

In some examples, physical domain determination unit 20 may further identify the plurality of adjacent pixels likely to be associated with the physical domain by associating the plurality of adjacent pixels with a particular instance of the physical domain. For example, the cross-sectional image may be one of a series of sequential cross-sectional images. The representation of the physical domain output by controller 16 may include identification of instances of the physical domain, such that each plurality of adjacent pixels likely to be associated with the physical domain may be identified as associated with an instance of the physical domain. In some examples, physical domain determination unit 20 may maintain a database in storage that includes associations of pluralities of adjacent pixels with particular instances of physical domains of component 12.

In some examples, physical domain determination unit 20 may identify a reference point of the plurality of adjacent pixels. The reference point may be any point or set of points of the plurality of adjacent pixels or based on dimensions of the plurality of adjacent pixels, such as an average height or width in pixels. For example, the reference point of the plurality of pixels may be a center of the plurality of adjacent pixels, such that physical domain determination unit 20 may determine the center of the plurality of adjacent pixels, such as an average x-coordinate and an average y-coordinate of the plurality of adjacent pixels rounded up or down to a pixel coordinate value.

Controller 16, such as instance determination unit 22, may associate the reference point of the plurality of adjacent pixels with a particular instance of the physical domain at a depth or image number associated with the cross-sectional image. For example, instance determination unit 22 may associate the x-coordinate and y-coordinate of the center of the plurality of adjacent pixels with a particular instance of the physical domain at the depth associated with the cross-sectional image. Instance determination unit 22 may store the reference point. For example, instance determination unit 22 may store the x-coordinate and y-coordinates of the center of plurality of adjacent pixels, such as in a list of center coordinates that associate the particular instance of the physical domain with sets of x-coordinates and y-coordinates at various depths.

FIG. 4C is an example cross-sectional image of a woven material that includes centers of pluralities of adjacent pixels. As shown in FIG. 4C, pluralities of adjacent pixels that do not exceed a particular aspect ratio, as defined by a geometric parameter related to an aspect ratio of the tows of the woven material, have centers of each plurality of adjacent pixels identified.

In some examples, instance determination unit 22 may determine that the cross-sectional image does not include a reference point associated with the particular instance of the physical domain of the component. In response to determining that the cross-sectional image does not include the reference point associated with the instance of the physical domain of the component, instance determination unit 22 may determine a projected reference point for the plurality of adjacent pixels based on at least the adjacent reference point of the adjacent sequential cross-sectional image. For example, as will be explained further below, controller 16 may identify a previously unidentified plurality of adjacent pixels as being associated with an instance of the physical domain based on adjacent cross-sectional images, such as through interpolation or extrapolation. Controller 16 may interpolate between or extrapolate from the adjacent reference points to determine a reference point that is likely to be associated with a plurality of adjacent pixels having the updated color values. Controller 16 may identify the plurality of adjacent pixels having the updated color values that includes the interpolated/extrapolated reference point as likely to be associated with the instance of the physical domain.

Physical domain determination unit 20 may repeat steps 66 and 68 for a plurality of sets of adjacent pixels to identify one or more plurality of adjacent pixels that are likely to be associated with the physical domain of component 12 in the cross-sectional image. For example, physical domain determination unit 20 may select a plurality of sets of adjacent pixels for the plurality of pixels of the cross-sectional image, analyze the plurality of sets of adjacent pixels, and identify pluralities of adjacent pixels likely to be associated with the physical domain of component 12 until all pixels of the plurality of pixels have been analyzed.

In some examples, controller 16 may adjust the geometric parameter during analysis of the plurality of pixels. Instances of the physical domain may have a range of shapes and/or sizes, such that physical domain determination unit 20 may initially select a value for the geometric parameter that may not adequately capture the instances of the physical domain. For example, physical domain determination unit 20 may analyze all pixels of the plurality of pixels, identify a number of identified sets of adjacent pixels, and compare the number of identified sets of adjacent pixels to an anticipated number of sets of adjacent pixels, such as may represent a known concentration of instances of the physical domain in component 12. In some examples, physical domain determination unit 20 may adjust the geometric parameter based on an anticipated distribution of instances of the physical domain in component 12. For example, a woven material may have a particular concentration of tows, such that for a portion of the woven material, the portion may contain an anticipated number of tows. In response to determining that the number of sets of adjacent pixels is less than an anticipated number of sets of adjacent pixels, physical domain determination unit 20 may adjust the geometric parameter so that the number of pluralities of adjacent pixels that are likely associated with the physical domain for the portion of component 12 may be greater than or equal to the anticipated number of tows.

In some examples, the plurality of adjacent pixels determined as likely to be associated with the physical domain, such as described in step 68 above, may be further analyzed based on whether the plurality of adjacent pixels is likely to be associated with a particular instance of the physical domain based on a geometric parameter associated with a physical dimension of the instance of the physical domain along the perspective. For example, the geometric parameter discussed above may represent physical dimensions of the instance of the physical domain along an x-axis and a y-axis. A geometric parameter may also represent predicted or known physical dimensions or changes of physical dimensions of the instance of the physical domain along a z-axis. Geometric parameters that may be used include, but are not limited to, a height or change in height, a width or change in width, an aspect ratio or change in aspect ratio, a shape or change in shape, and the like, as measured in pixels. Factors for selecting a geometric parameter include, but are not limited to, predicted or known spacing of instances of the physical domain, predicted or known shape of instances of the physical domain, predicted or known orientations of instances of the physical domain, predicted or known distribution of instances of the physical domain, and the like. In some examples, the geometric parameter may be based on a predicted or known average physical dimension of a plurality of instances of the physical domain.

Controller 16, such as instance determination unit 22, may determine whether a plurality of adjacent pixels is likely to be associated with component 12 based on a geometric parameter associated with a geometry of the physical domain of component 12 along the perspective. The geometric parameter may be based on a geometric dimension, such as a change in cross-sectional dimensions, of an instance of the physical domain. The geometric dimension may represent a predicted or known change or variation, or lack of change or variation, of physical dimensions in the x-axis or y-axis of the instance of the physical domain based on a geometry of the instance of the physical domain along the z-axis. For example, as shown in FIG. 2A, the second plurality of tows 36 may alternate along the x-axis with respect to the y-axis. Similarly, as shown in FIG. 2C, first portion 42A of tow 42 at the first depth along the z-axis may be different than second portion 42B of tow 42 at the second depth along the z-axis. The geometric parameter may represent the change between first portion 42A and second portion 42B based on the change in depth from the first depth to the second depth as a result of the geometry of tow 42.

In some examples, the cross-sectional image is from a series of sequential cross-sectional images captured at various depth increments along the perspective. The geometric parameter may represent a relative tolerance of a change in a position or dimension of the instance of the physical domain associated with a change in depth between two points of the instance of the physical domain, as represented by a change in position or dimension between reference points of adjacent images. For example, the instance of the physical domain may exhibit a particular amount of variation in the x-axis or y-axis with respect to two adjacent cross-sections along the z-axis. As such, the tolerance of the change in position or dimension may be based on an anticipated variation in the x-axis and/or y-axis of the instance of the physical domain between points along the z-axis relative to one another. Instance determination unit 22 may determine whether the reference point of the plurality of adjacent pixels is within the tolerance represented by the geometric parameter.

Instance determination unit 22 may receive an adjacent reference point of a plurality of adjacent pixels for an adjacent cross-sectional image. The plurality of adjacent pixels may be associated with the particular instance of the physical domain. Instance determination unit 22 may compare the adjacent reference point with the reference point of the plurality of adjacent pixels and determine whether the reference point of the plurality of adjacent pixels is within the tolerance represented by the geometric parameter from the adjacent reference point of the adjacent cross-sectional image of the series of sequential cross-sectional images.

In response to determining that the reference point is within the tolerance represented by the geometric parameter, instance determination unit 22 may store the reference point of the plurality of adjacent pixels and associate the reference point of the plurality of adjacent pixels with the instance of the physical domain. In response to determining that the reference point is not within the tolerance represented by the geometric parameter, instance determination unit 22 may determine that the plurality of pixels is not likely to be associated with the instance of the physical domain.

In some examples, controller 16 may identify cross-sectional images for which an instance of the physical domain has not been associated with a plurality of adjacent pixels. Controller 16 may mark the cross-sectional image, or depth associated with the cross-sectional image, for interpolation or extrapolation of a plurality of adjacent pixels for association with the instance of the physical domain.

For example, physical domain determination unit 20 may not identify all pluralities of adjacent pixels that are likely associated with an instance of a physical domain due to alignment variation of instances of physical domains in a component, imaging errors of the component, and other imperfections. For example, two instances of a physical domain in a component may touch at a particular depth, such that a single plurality of adjacent pixels in a cross-sectional image for the particular depth may be associated with the two instances of the physical domain. The single plurality of adjacent pixels may have a pixel dimension, such as an aspect ratio, that is outside an aspect ratio range. In the resulting cross-sectional image, the plurality of adjacent pixels that is associated with the two instances of the physical domain may not be identified as associated with either of the two tows.

In some examples, controller 16 may identify a plurality of adjacent pixels as being associated with an instance of the physical domain based on adjacent cross-sectional images. In some examples, controller 16 may identify the plurality of adjacent pixels through interpolation or extrapolation. For example, controller 16 may receive adjacent reference points associated with the instance of the physical domain from adjacent cross-sectional images (interpolation) or from an adjacent cross-sectional image and previous cross-sectional image in the sequence (extrapolation). Controller 16 may interpolate between or extrapolate from the adjacent reference points to determine a reference point that is likely to be associated with a plurality of adjacent pixels having the updated color values. Controller 16 may identify the plurality of adjacent pixels having the updated color values that includes the interpolated/extrapolated reference point. Controller 16 may identify the plurality of adjacent pixels as likely to be associated with the instance of the physical domain. In some examples, controller 16 may further divide the plurality of adjacent pixels. For example, if the plurality of adjacent pixels is associated with more than one instance of the physical domain, the plurality of adjacent pixels may be divided so that a subdivision of the plurality of adjacent pixels is associated with a single instance of the physical domain.

FIG. 4D is a cross-sectional image of the woven material discussed in FIG. 4A that includes pluralities of adjacent pixels identified through interpolation and/or extrapolation. Some pluralities of adjacent pixels having the updated color value were not identified in FIG. 4C. However, those pluralities of adjacent pixels were identified from adjacent cross-sectional images through interpolation or extrapolation.

In some examples, controller 16, such as image unit 24, may determine a representation of component 12 that includes the plurality of adjacent pixels representing the physical domain. In some examples, image unit 24 may determine the representation of component 12 by differentiating between pluralities of adjacent pixels that are likely to be associated with the physical domain and pluralities of adjacent pixels that are not likely to be associated with the physical domain by determining a color of each of the pluralities of adjacent pixels. For example, image unit 24 may assign a first color value to pluralities of adjacent pixels that are determined as likely to be associated with the physical domain and a second color value to pluralities of adjacent pixels that are not determined as likely to be associated with the physical domain.

FIG. 4E is a cross-sectional image of the woven material discussed in FIG. 4A. The pluralities of adjacent pixels that are likely to be associated with the target physical domain have a white color value and the pluralities of adjacent pixels that are not likely to be associated with the target physical domain have a grey color.

In some examples, imaging unit 24 may determine whether the plurality of adjacent pixels is likely to be associated with the component based on a distribution parameter associated with a distribution of the component in the material. The distribution parameter may be a percentage of the pluralities of adjacent pixels that are likely to be associated with the component that have a particular value of geometric parameter. To determine whether the plurality of adjacent pixels is likely to be associated with the component based on the distribution parameter, controller 16 may determine a range of values of the geometric parameter associated with the distribution parameter. Controller 16 may adjust the geometric parameter and evaluate each plurality of adjacent pixels with respect to the adjusted geometric parameters until the percentage of pluralities of adjacent pixels that meet the adjusted geometric parameters is below the distribution parameters. Controller 16 may update the color values of the corresponding pluralities of adjacent pixels to indicate that the pluralities of adjacent pixels are within the distribution parameter.

Controller 16 may output the representation of component 12 including the plurality of adjacent pixels representing the physical domain (70). For example, controller 16 send a signal to display 26 that includes the representation of component 12. The representation of component 12 may include a directionalized representation of component 12. For example, controller 16 may classify pluralities of adjacent pixels of the plurality of images as instances of the physical domain in the representation of component 12. In some examples, controller 16 may classify the pluralities of adjacent pixels using color values. For example, controller 16 may assign a particular color value to all instances of a particular physical domain, or may assign a particular color value to a particular instance of the physical domain. The directionalization information of the representation of component 12 may be used by, for example, modeling software to construct a model, such as a finite element mesh or fluid dynamic mesh, based on the representation of component 12.

The technique of FIG. 3 described above may be used to generate a representation of a physical domain or a plurality of physical domains of a component from a cross-sectional image of the component. In some examples, the cross-sectional image of the component may be a cross-sectional image of a series of sequential cross-sectional images of the component. For example, the cross-sectional image of component 12 may be an x-ray tomographic representation of component 12 at a particular depth along the perspective. The series of sequential cross-sectional images may include a plurality of cross-sectional images captured at various depth increments along the perspective. The technique of FIG. 3 may be used on each of the series of sequential cross-sectional images to generate representations of the physical domain or plurality of physical domains of the component that may be used, such as by controller 16 or another computing device, to generate a three-dimensional representation of the component, including the plurality of physical domains.

Figure 5:
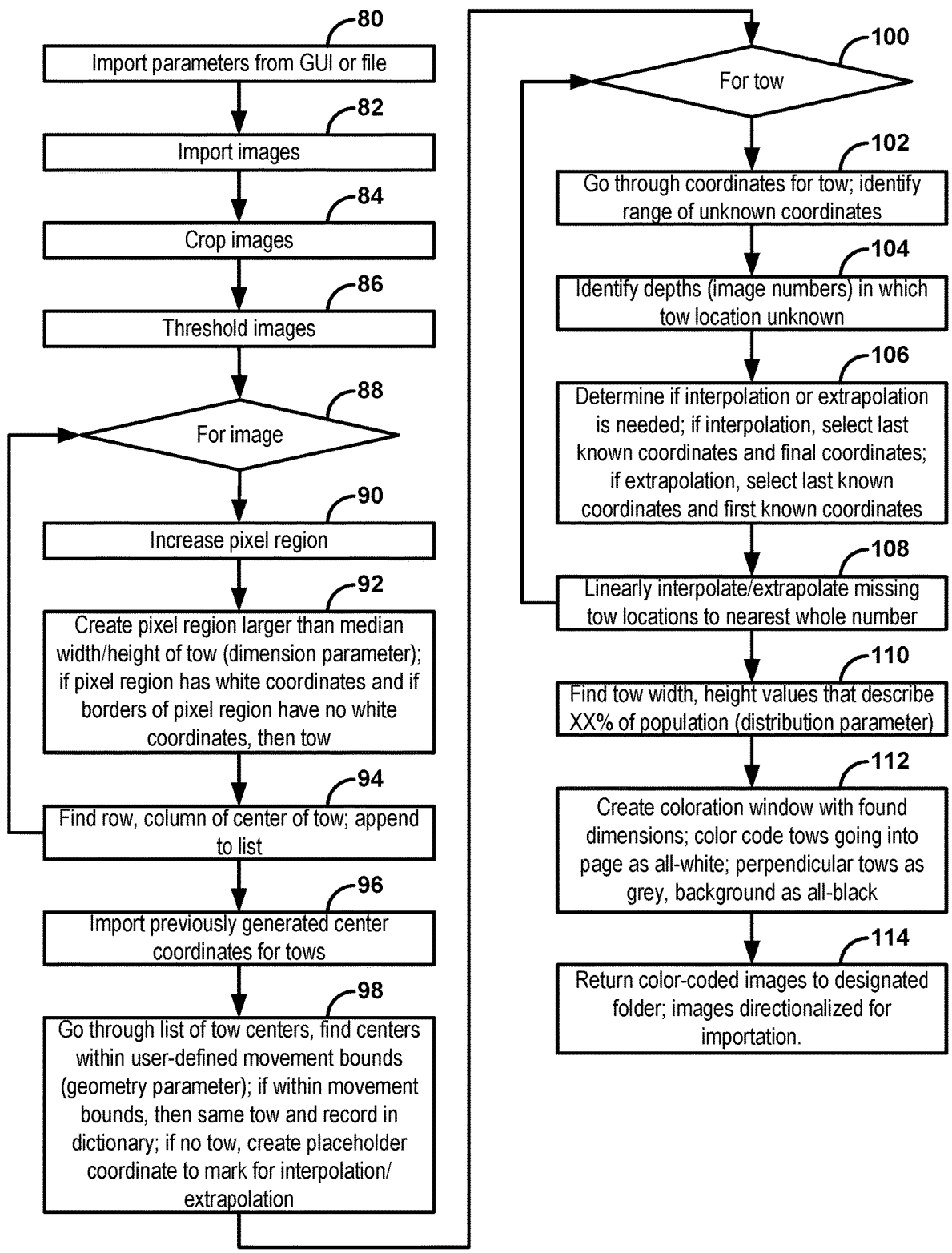
FIG. 5 is a flow diagram illustrating an example technique for generating a representation of tows of a woven material from cross-sectional images of the woven material.

FIG. 5 is a flow diagram illustrating another example technique for generating a representation of tows of a woven material from a cross-sectional image of the woven material. The technique of FIG. 5 will be described with concurrent reference to FIGS. 4A-4E and may be implemented using system 10 of FIG. 1, although one of ordinary skill will understand that the technique of FIG. 5 may be performed by other systems that include more or fewer components, and that system 10 may perform other techniques.

A controller, such as controller 16 of FIG. 1, may import parameters from a graphic user interface (GUI) or file (80). For example, a user may enter parameters into the GUI or issue a command for controller 16 to access parameters from a file at a particular location. Parameters may include: geometric parameters, such as a median tow height, median tow width, median tow aspect ratio, median tow area, and movement bounds of a tow center; distribution parameters, such as a percentage of tows of a population of tows in an image; and the like.

Controller 16 may import cross-sectional images of the woven material (82) by receiving the cross-sectional images of the material at a perspective. For example, controller 16 may access images from a file, such as a user defined file. In some examples, controller 16 may receive images from an imaging system, such component imaging device 14 of FIG. 1. The images may be cross-sectional images of the woven material at a perspective. For example, controller 16 may receive the cross-sectional image of FIG. 4A. Controller 16 may represent the cross-sectional images as a stack of x-coordinates, y-coordinates, and z-coordinates corresponding to a width (x-axis), height (y-axis), and depth (z-axis), respectively.

Controller 16 may crop the cross-sectional images (84). For example, controller 16 may identify pixels of the plurality of pixels of the cross-sectional image that do not contain any variations in color value of pixels indicating that the pixels may be cropped from the cross-sectional image.

Controller 16 may threshold the cross-sectional images (86). For example, the controller may perform steps 66 and 68 of FIG. 3 by determining a threshold color value based on color values associated with the plurality of pixels of the cross-sectional images and set an updated color value for each pixel of the plurality of pixels based on the threshold color value. In the example of FIG. 5, controller 16 may determine a grey color value as the threshold color value, as the color values of the plurality of pixels may be substantially light for pixels associated with tows and substantially dark for pixels associated with the background. Controller 16 may set the pixels associated with tows to white, as light pixels have a color value higher than the grey color value, and pixels associated with the background to black, as dark pixels have a lower color value than the grey color value.

For each image, controller 16 may identify pluralities of adjacent pixels that are likely associated with a tow of the target orientation (88). Controller 16 may create a pixel region larger than a geometric parameter, such as a pixel window corresponding to a median width and height of a tow. Controller 16 may evaluate whether the pixel region includes white coordinates, which are associated with a tow, and whether the borders of the pixel region include no white coordinates (92). Controller 16 may increase the size of a pixel region to capture a suitable plurality of adjacent pixels likely to be associated with the tows of the target orientation (90). If the pixel region includes a plurality of white pixels and the border of the pixel region does not include a white pixel, controller 16 may identify center coordinates of the plurality of white pixels as a reference point for the plurality of adjacent pixels (94).

In some examples, controller 16 may import a list of previously generated center coordinates for tows, such as for an adjacent cross-sectional image in the stack. Controller 16 may go through the list of previously generated center coordinates and find center coordinates of the pluralities of adjacent pixels of the current cross-sectional image that are within a geometric parameter, such as a user-defined movement bounds, between adjacent cross-sectional images (98). If the center coordinates are within the user-defined movement bounds, then controller 16 may identify the plurality of adjacent pixels as associated with the same tow as the plurality of adjacent pixels of the adjacent cross-sectional image. Controller 16 may record information associated with the plurality of adjacent pixels, such as the center coordinates, in a dictionary. If the plurality of adjacent pixels is not within the user-defined movement bounds, controller 16 may create a placeholder associated with the cross-sectional image to mark the center coordinates for interpolation/extrapolation.

For each tow, controller 16 may evaluate whether the tow includes a plurality of adjacent pixels for each depth and identify pluralities of adjacent pixels that have not been identified as associated with the tow (100). Controller 16 may go through center coordinates associated with the tow (102) and identify depths or image numbers for which the center coordinates are unknown (104). Controller 16 may identify whether to interpolate or extrapolate for the depths for which the center coordinates are unknown (106). If interpolation, controller 16 may select the last known center coordinates in the stack of images and the final center coordinates associated with the tow. If extrapolation, the controller may select the first known center coordinates and the last known center coordinates associated with the tow. Controller 16 may interpolate or extrapolate center coordinates for missing tow locations to a nearest whole number (corresponding to a pixel location) (108).

Controller 16 may determine geometric parameter values, such as width and height values, of the plurality of adjacent pixels associated with tows that describe a distribution parameter, such as a percentage of a population of tows (110). Controller 16 may create a coloration window having the found dimensions and color code tows of the target orientation, such as going into a page as shown in FIG. 4E, as all-white, tows of another orientation, such as perpendicular to the page, as grey, and the background or matrix as black (112). Controller 16 may return color-coded images to a designated folder (114). The controller may directionalize the images for importation.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method, comprising:
receiving, by a controller, a cross-sectional image of a component at a perspective, wherein the cross-sectional image comprises a plurality of pixels representing the component;
determining, by the controller, a threshold color value;
setting, by the controller, an updated color value for each pixel of the plurality of pixels based on the threshold color value;
analyzing, by the controller, a set of adjacent pixels of the cross-sectional image, wherein the set of adjacent pixels is selected based on a geometric parameter, and wherein the geometric parameter is based on an expected geometry of a physical domain of the component;
identifying, by the controller, a plurality of adjacent pixels from the set of adjacent pixels that is likely to be associated with the physical domain of the component based on the updated color values associated with the plurality of adjacent pixels, wherein the component comprises at least two physical domains; and
outputting, by the controller, a representation of the component including the plurality of adjacent pixels that are likely to be associated with the physical domain.

2. The method of claim 1, wherein the geometric parameter defines a size or shape of a pixel region that includes the set of adjacent pixels and corresponds to a size or shape of an instance of the physical domain, and wherein identifying the plurality of adjacent pixels from the set of adjacent pixels that is likely to be associated with the physical domain of the component based on the updated color values associated with the plurality of adjacent pixels further comprises identifying, by the controller, the plurality of adjacent pixels that include an updated color value associated with the physical domain and fit into the pixel region.

3. The method of claim 2, wherein the component comprises a woven material, the physical domain comprises at least one tow, and the geometric parameter is an aspect ratio associated with an average cross-section of the at least one tow.

4. The method of claim 1, further comprising determining, by the controller, whether the plurality of adjacent pixels is likely to be associated with the component based on a geometric parameter associated with a geometry of the physical domain of the component at the perspective.

5. The method of claim 4, wherein determining whether the plurality of adjacent pixels is likely to be associated with the physical domain based on the geometric parameter further comprises:
identifying, by the controller, a reference point of the plurality of adjacent pixels; and
determining, by the controller, whether the reference point of the plurality of adjacent pixels is within a value of the geometric parameter.

6. The method of claim 5, wherein the reference point of the plurality of pixels is a center of the plurality of pixels and wherein identifying the reference point of the plurality of adjacent pixels comprises identifying a center of an area defined by the plurality of adjacent pixels.

7. The method of claim 5, wherein the cross-sectional image is from a series of sequential cross-sectional images captured at various depth increments along the perspective, wherein the geometric parameter represents an anticipated change in a position of the component in the cross-sectional image between sequential cross-sectional images of the series of sequential cross-sectional images, and wherein determining whether the reference point of the plurality of adjacent pixels is within a value of the orientation parameter further comprises determining, by the controller, whether the reference point of the plurality of adjacent pixels is within the value of the geometric parameter from an adjacent reference point of an adjacent sequential cross-sectional image of the series of sequential cross-sectional images.

8. The method of claim 7, further comprising storing, by the controller and in response to determining that the reference point is within the value of the geometric parameter, the reference point of the plurality of pixels.

9. The method of claim 7, further comprising:
determining, by the controller, that the cross-sectional image does not include a reference point associated with the physical domain of the component; and
determining, by the controller and in response to determining that the cross-sectional image does not include the reference point associated with the physical domain of the component, a projected reference point for the plurality of adjacent pixels based on at least the adjacent reference point of the adjacent sequential cross-sectional image.

10. The method of claim 9, wherein the projected reference point is determined by interpolation or extrapolation.

11. The method of claim 1, further comprising determining, by the controller and in response to identifying the plurality of adjacent pixels as likely to be associated with the physical domain, a color of the plurality of adjacent pixels.

12. The method of claim 11, wherein the color is determined based on a distribution parameter associated with a distribution of the component in the material.

13. The method of claim 12, wherein the distribution parameter is a percentage of pluralities of adjacent pixels that are likely to be associated with the component that are identified in the cross-sectional image, and wherein determining the color further comprises:
determining, by the controller, a range of values of the geometric parameter associated with the distribution parameter; and
determining, by the controller, that the dimension of the plurality of adjacent pixels is within the range of values of the geometric parameter associated with the distribution parameter.

14. A system, comprising:
a controller configured to:
receive a cross-sectional image of a component at a perspective, wherein the cross-sectional image comprises a plurality of pixels representing the component;
determine a threshold color value;
set an updated color value for each pixel of the plurality of pixels based on the threshold color value;
analyze a set of adjacent pixels of the cross-sectional image, wherein the set of adjacent pixels is selected based on a geometric parameter, and wherein the geometric parameter is based on an expected geometry of a physical domain of the component;
identify a plurality of adjacent pixels from the set of adjacent pixels that is likely to be associated with the physical domain of the component based on the updated color values associated with the plurality of adjacent pixels, wherein the component comprises at least two physical domains; and
output a representation of the component including the plurality of adjacent pixels that are likely to be associated with the physical domain.

15. The system of claim 14, wherein the geometric parameter defines a size or shape of a pixel region that includes the set of adjacent pixels and corresponds to a size or shape of an instance of the physical domain, and wherein the controller is further configured to identify the plurality of adjacent pixels that include an updated color value associated with the physical domain and fit into the pixel region.

16. The system of claim 14, wherein the controller is further configured to determine whether the plurality of adjacent pixels is likely to be associated with the component based on a geometric parameter associated with a geometry of the physical domain of the component at the perspective.

17. The system of claim 14, wherein the controller is further configured to:
   identify a reference point of the plurality of adjacent pixels; and
   determine whether the reference point of the plurality of adjacent pixels is within a value of the geometric parameter.

18. The system of claim 17, wherein the cross-sectional image is from a series of sequential cross-sectional images captured at various depth increments along the perspective, wherein the geometric parameter represents an anticipated change in a position of the component in the cross-sectional image between sequential cross-sectional images of the series of sequential cross-sectional images, and wherein the controller is further configured to determine whether the reference point of the plurality of adjacent pixels is within the value of the geometric parameter from an adjacent reference point of an adjacent sequential cross-sectional image of the series of sequential cross-sectional images.

19. The system of claim 14, further comprising a component imaging device.

20. A non-transitory computer-readable storage medium storing instructions that, when executed, cause a processor to:
   receive a cross-sectional image of a component at a perspective, wherein the cross-sectional image comprises a plurality of pixels representing the component;
   determine a threshold color value;
   set an updated color value for each pixel of the plurality of pixels based on the threshold color value;
   analyze a set of adjacent pixels of the cross-sectional image, wherein the set of adjacent pixels is selected based on a geometric parameter, and wherein the geometric parameter is based on an expected geometry of a physical domain of the component;
   identify a plurality of adjacent pixels from the set of adjacent pixels that is likely to be associated with the physical domain of the component based on the updated color values associated with the plurality of adjacent pixels, wherein the component comprises at least two physical domains; and
   output a representation of the component including the plurality of adjacent pixels that are likely to be associated with the physical domain.

* * * * *